United States Patent Office 3,445,427
Patented May 20, 1969

3,445,427
ADHESIVE-FORMING COMPOSITIONS CONTAINING RANDOM POLY - m - CARBORANYLENE-SILOXANE COPOLYMERS AND ADHESIVES PREPARED THEREFROM
Trescott B. Larchar, Sr., Hamden, Conn., assignor to Olin Mathieson Chemical Corporation, a corporation of Virginia
No Drawing. Filed Dec. 29, 1967, Ser. No. 694,402
Int. Cl. C08g 33/18; C09j 3/16
U.S. Cl. 260—46.5     14 Claims

ABSTRACT OF THE DISCLOSURE

Adhesive-forming compositions are provided according to this invention by mixing a random poly-m-carboranylenesiloxane copolymer comprising units having the following formulas

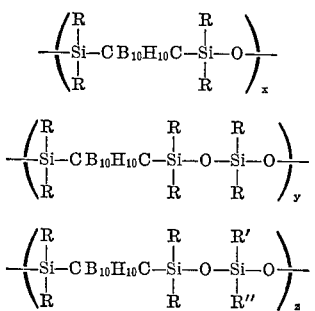

wherein each R is an independently selected alkyl or aryl; R' is hydrogen, alkyl, aryl, vinyl or a vinyl-containing moiety; R'' is vinyl or a vinyl-containing moiety; $x$ and $y$ are independently selected integers greater than 1 and $z$ is 0 or an integer greater than 0 with the proviso that the mole ratio of $x/y+z$ is between about .1 and about 10, with a boron-oxygen-containing compound. These compositions are cured to provide adhesives having high shear strengths and high temperature resistant properties.

---

This invention relates to adhesive-forming compositions containing random poly-m-carboranylenesiloxane copolymers, to adhesives produced therefrom and to structures employing such adhesives. More particularly, this invention relates to adhesive compositions comprising a random poly-m-carboranylenesiloxane copolymer and a boron-oxygen-containing compound and to adhesives produced by curing or vulcanizing the aforesaid adhesive-forming compositions.

The use of various boron compounds in selected adhesives has been reported previously in the literature. For example, U.S. Patent 2,944,992 discloses adhesive comprising boric oxide and a polymer of a heterocyclic nitrogen base. While providing suitable bonding for some applications, such adhesives are not suitable for use in specialized areas where high shear strength and high temperature-resistant properties are desired.

Now it has been found that adhesives having the aforementioned properties are provided in accordance with this invention by curing an adhesive-forming composition comprising a boron-oxygen-containing compound and a random poly-m-carboranylenesiloxane copolymer having the formulas I    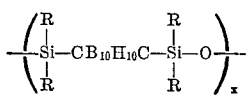

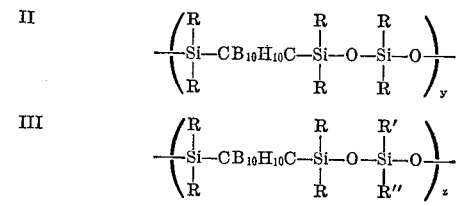

wherein each R is an independently selected alkyl or aryl; R' is hydrogen, alkyl, aryl, vinyl or a vinyl-containing moiety; R'' is vinyl or a vinyl-containing moiety; $x$ and $y$ are independently selected integers greater than 1 and $z$ is 0 or an integer greater than 0 with the proviso that the mole ratio of $x/y+z$ is between about .1 and about 10.

The random poly-m-carboranylenesiloxane copolymers employed in the preparation of the adhesive-forming compositions of this invention are fully described in copending patent application, U.S. Ser. No. 694,403, and said application is hereby incorporated by reference in its entirety herein.

Random poly - m - carboranylenesiloxane copolymers comprising units having the Formulas I and II are provided by reacting a 1,7-bis[alkoxydialkyl(or diaryl)silyl]-m-carborane with a dihalodialkyl(or diaryl)silane and a 1,7 - bis[halodialkyl(or diaryl)silyl]-m-carborane in the presence of a reaction catalyst.

The 1,7-bis[halodialkyl(or diaryl)silyl]-m-carboranes useful as starting materials in the preparation of the polymers of this invention have the formula

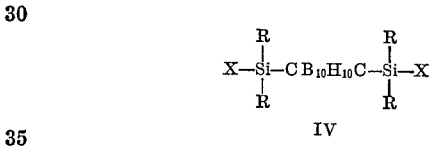

IV where R is as previously described and X is chlorine, bromine or iodine. These compounds are prepared from di(alkali metal)-m-carborane and dihalodialkyl(or diaryl)silane as described by S. Papetti et al. in Inorg. Chem. 3, 1448 (1964). Useful 1,7-bis[halodialkyl(or diaryl)silyl]-m-carboranes IV include 1,7-bis(chlorodimethylsilyl)-m-carborane, 1,7-bis(chlorodiethylsilyl) - m - carborane, 1,7-bis(chloromethylethylsilyl)-m-carborane, 1,7-bis(chlorodi-n-propylsilyl)-m-carborane, 1,7-bis(chlorodi-n-butylsilyl)-m-carborane, 1,7-bis(chlorodiisoamylsilyl)-m-carborane, 1,7-bis(chlorodi-n-hexylsilyl)-m-carborane, 1,7-bis(chlorodinonylsilyl)-m-carborane, 1,7 - bis(chlorodioctylsilyl)-m-carborane, 1,7 - bis(chlorodidodecylsilyl)-m-carborane, 1,7 - bis(chlorodi-n-octylsilyl)-m-carborane, 1,7-bis(chlorodiphenylsilyl)-m-carborane, 1,7-bis(chloroditolylsilyl)-m-carborane, 1,7 - bis(chlorodixylylsilyl)-m-carborane, etc. and the corresponding bromine and iodine derivatives.

1,7-bis[alkoxydialkyl(or diaryl)silyl]-m-carboranes employed in the reaction with the previously described 1,7-bis[halodialkyl(or diaryl)silyl] - m - carboranes have the formula

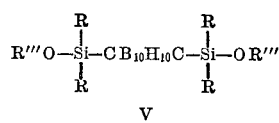

V where R is as previously described and R''' is alkyl having 1 to 6 carbon atoms and are readily prepared by reacting one of the previously described 1,7-bis[halodialkyl(or diaryl)silyl]-m-carboranes IV with an appropriate alcohol according to the process described by S. Papetti et al. in Inorg. Chem. 3, 1448 (1964).

Included in the group of 1,7-bis[alkoxydialkyl(or diaryl)silyl]-m-carboranes V useful as starting materials are 1,7-bis(methoxydimethylsilyl)-m-carborane,
1,7-bis(methoxydiethylsilyl)-m-carborane,
1,7-bis(methoxymethylethylsilyl)-m-carborane,
1,7-bis(ethoxydimethylsilyl)-m-carborane,
1,7-bis(ethoxydi-n-propylsilyl)-m-carborane,
1,7-bis(ethoxyethylisopropylsilyl)-m-carborane,
1,7-bis(n-propoxydiisoamylsilyl)-m-carborane,
1,7-bis(isopropoxydi-n-propylsilyl)-m-carborane,
1,7-bis(n-butoxydimethylsilyl)-m-carborane,
1,7-bis(isobutoxydi-n-propylsilyl)-m-carborane,
1,7-bis(ethoxydipropylsilyl)-m-carborane,
1,7-bis(methoxydi-n-butylsilyl)-m-carborane,
1,7-bis(methoxydi-n-hexylsilyl)-m-carborane,
1,7-bis(methoxydiphenylsilyl)-m-carborane,
1,7-bis(methoxyditolylsilyl)-m-carborane,
1,7-bis(methoxydixylylsilyl)-m-carborane, etc.

Dihalodialkyl(or diaryl)silanes suitable for use in the preparation of the copolymers of this invention have the following formula wherein R and X are as previously described.

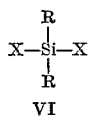

VI

Illustrative of these compounds are dimethyldichlorosilane, methyl-n-propyldichlorosilane, diethyldichlorosilane, ethylmethyldichlorosilane, diisopropyldichlorosilane, diamyldichlorosilane, dihexyldichlorosilane, diphenyldichlorosilane, methyltolyldichlorosilane, dixylyldichlorosilane, ethylisobutyldichlorosilane, n-propyltolyldichlorosilane, etc., and the corresponding bromine and iodine derivatives.

Random copolymers comprising units having the Formulas I and II are provided by employing a 1,7-bis[halodialkyl(or diaryl)silyl]-m-carborane IV, a 1,7-bis[alkoxydialkyl(or diaryl)silyl]-m-carborane V and a dihalodialkyl(or diaryl)silane VI as reactants. Mixtures of two or more of each of the previously described reactants can also be utilized to provide copolymers having a variety of substituents, e.g., methyl, ethyl, propyl, etc.

While any of the previously described 1,7-bis[halodialkyl(or diaryl)silyl]-m-carboranes IV, 1,7-bis[alkoxydialkyl(or diaryl)silyl]-m-carboranes V, and dihalodialkyl (or diaryl)silanes VI can be employed in the preparation of the poly-m-carboranylenesiloxanes of this invention, preferred embodiments employ those beginning reactants wherein R is lower alkyl, i.e., alkyl having 1–4 carbon atoms.

Where random copolymers comprising units I, II and III are desired, a compound having the formula

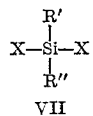

VII where R', R" and X are as previously described is included as a reactant together with Compounds IV, V and VI. Illustrative compounds having the Formula VII are dichloro(1-vinyl-o-carboran-2-yl)methylsilane, methylvinyldichlorosilane, divinyldichlorosilane, methylallyldichlorosilane, ethylallyldichlorosilane, n-propylallyldichlorosilane, ethylisopropenyldichlorosilane, diallyldichlorosilane, etc. Particularly preferred are those Compounds VII wherein R' is lower alkyl, i.e., alkyl having 1 to 4 carbon atoms, or phenyl and R" is vinyl or 1-vinyl-o-carboran-2-yl. The inclusion of an unsaturated substituent in the copolymer by utilizing one of the previously described Compounds VII as a reactant accelerates curing of the copolymer.

While large amounts of the previously described vinyl-containing silane Compound VII can be employed in the preparation of the polymers of this invention, it is preferred to utilize approximately 0.2 to 10 mole percent based on the dihalodialkyl(or diaryl)silane.

Ferric chloride has been found to be a particularly effective reaction catalyst in the preparation of the polymers of this invention. Anhydrous ferric chloride or any of the various hydrated ferric chlorides or mixtures thereof can be suitably employed. Generally the catalyst is added in an amount from about 0.01 to about 5 mole percent and preferably from about 0.5 to about 3.0 percent based on the total number of moles of the reactants employed. However, greater or lesser amounts can be effectively employed.

The preparation of the random poly-m-carboranylenesiloxane copolymers is carried out at a temperature between about 100 to about 250° C. and preferably from about 110 to about 190° C. Preferably, at the beginning of the reaction a temperature from about 130 to 140° C. is maintained. After about 50 to about 70 percent of the theoretical amount of gaseous alkyl by-product has evolved the reaction mixture commences to solidify and the reaction appears to cease. Therefore, it has been found desirable in the final stage to raise the temperature to about 175 to about 190° C. at which temperature the gas evolution resumes. If desired, additional catalyst can be added at this point. The product is then heated at this temperature range for about one hour. Elimination of the catalyst from the polymeric product can be accomplished by washing with acetone or a mixture of acetone and concentrated hydrochloric acid.

The random poly-m-carboranylenesiloxane copolymers of this invention have molecular weights up to about 200,000 and even greater; however, polymeric products having molecular weights of at least about 2,000 are generally preferred.

While any copolymer containing randomly dispersed units having the Formulas I, II and III can be employed in the practice of this invention, random copolymers wherein the mole ratio of $x/y+z$ is between about 0.5 and about 8 are preferred. Mixtures of the previously-described random poly-m-carboranylenesiloxane copolymers can also be suitably utilized in the adhesive-forming compositions described hereinafter.

Any boron-oxygen-containing compound can be employed in the preparation of the adhesive forming compositions of this invention. Exemplificative compounds include any of the boric acids such as boric acid, orthoboric acid, metaboric acid, etc.; the esters of the boric acids such as trimethyl borate, triethyl borate, tri-n-propyl borate, tri-n-butyl borate, triamyl borate, tri-n-dodecyl borate, tri-hexylene-glycol borate, tri(2-cyclohexylcyclohexyl)borate, tri(diisobutylcarbinyl)borate, tristearly borate, trioleyl borate, triphenyl borate, tri-o-cresyl borate, 2,6-di-tertiary-butyl-p-cresyl-di-allyl borate, 2,6-di-tertiary-butyl-p-cresyl-di-ethyl borate, 2,6-di-tertiary-butyl-p-cresyl-di-2-ethylhexyl borate, 2,6-di-tertiary-butyl-p-cresyl-di-n-butyl borate, and the like; salts of the boric acids such as sodium metaborate, magnesium borate, etc.; boric oxide and mixtures of the previously described compounds. Preferred embodiments utilize the boric acids, boric oxide, or mixtures thereof. While the boron-oxygen-containing compound is employed in an amount between about 10 and about 100 parts by weight per 100 parts by weight of the random poly-m-carboranylenesiloxane copolymer, preferably between about 40 and about 60 parts by weight are employed.

Optional ingredients which can be suitably employed in the adhesive-forming compositions of this invention include inorganic fillers such as the silicates, titanium dioxide, aluminum oxide, calcium carbonate, carbon black, clay, glass fiber, talc, asbestos, etc. However, while the aforementioned materials can be utilized, only the random poly-m-carboranylenesiloxane copolymer and the previously described boron-oxygen-containing compound are essential to the practice of this invention.

The adhesive-forming compositions are prepared by admixing the previously described ingredients until a homogenous dispersion is obtained. Preferably, the elastomeric random poly-m-carboranylenesiloxane copolymers are milled with the boron-oxygen-containing compound to provide a suitable dispersion. The resulting composition is applied between the surfaces to be bonded and cured by heating at temperatures ranging from about 600° to about 900° F. to provide an adhesive bond having high shear strength and high temperature resistant properties.

A wide variety of similar and dissimilar surfaces can be suitably bonded by the adhesives of this invention. Illustrative surfaces include various metals and alloys such as stainless steel, titanium, etc.; plastics such as phenolic resins, epoxy resins, etc.; rubbers; cured high-temperature elastomers; wood; glass and ceramics. The surfaces to be bonded are generally prepared according to conventional techniques. Thus, for example, metals are cleaned and degreased by treatment with suitable chemicals. It is also feasible to employ a wetting agent, such as a liquid poly-m-carboranylenesiloxane, to prime a metal surface; however, excellent bonding is realized without the use of such materials.

The composites which are bonded with the adhesives of this invention are resistant to deterioration at high temperature. For example, they are used in applications where they are exposed to temperatures of 800° F. and higher. A particularly surprising property of these adhesives is their high shear strength. Thus, when tested as described hereinafter, composites bonded by these adhesives exhibited shear strengths above 1,000 and in most instances above 1,500 p.s.i. Composites bonded with adhesives formulated in a similar manner but employing various linear poly-m-carbonanylenesiloxanes instead of random poly-m-carboranylenesiloxane copolymers exhibited shear strengths in the range of about 700 to 900 p.s.i.

The following examples will serve to illustrate the preparation of various adhesive-forming compositions and adhesives in accordance with this invention.

In the examples, shear strength was determined following the general procedure of ASTM D 1002–64. Two 1 x 5 inch titanium alloy strips, comprising 90 percent by weight titanium, 4 percent vanadium and 6 percent aluminum, were degreased by immersion in toluene followed by an acetone rinse. The strips were then cleaned by etching via immersion for two minutes in a solution of 100 ml. of 85 percent of phosphoric acid/2 ml. of hydrofluoric acid. After washing in distilled water, the strips were dried with acetone and then heated to approximately 100° F. in an oven. Unless otherwise specified in the examples, a poly-m-carboranylenesiloxane primer comprising recurring units having the following formula

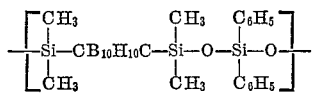

was preheated to approximately 150 F. and applied to one end of each strip to form a primed surface having an area of one square inch; the primer was applied to a dry thickness of approximately 3 mils. After allowing the primed strips to cool to room temperature, a one square inch piece of the compounded adhesive was placed between the primed surface and the area to be bonded compressed by means of a C-clamp to approximately 50 p.s.i. The joint was cured at 550° F. for one hour followed by heating at 600° F. for an additional hour. After allowing the assembly to cool to room temperature, the C-clamp was removed and shear strength of the joint determined by placing of the strips in tension. The reported data represents the maximum force in p.s.i. which was attained during stretching of the joint.

EXAMPLE 1

A. Preparation of polymer 1,7-bis(methoxydimethylsilyl)-m-carborane (176.4 g.), 1,7-bis(chlorodimethylsilyl)-m-carborane (44.42 g.), dimethyldichlorosilane (53.64 g.), anhydrous ferric chloride (0.45 g.) and hydrated ferric chloride (0.45 g.) were mixed in a 300 ml. single-necked flask which was equipped with a stirrer and a nitrogen inlet line for flushing the apparatus. The reaction flask was also connected to a vacuum line having a bubble-off and an outlet for sampling volatile products. A wet-test meter was connected to the bubble-off to measure methyl chloride evolution. The flask was placed in an oil bath and heated at a temperature of about 130°–135° C. After one hour, the wet-test meter indicated that the reaction had ceased. A second portion of catalyst consisting of 0.45 g. anhydrous ferric chloride and 0.45 g. hydrated ferric chloride was added to the reaction mixture. Heating was continued and gas evolution resumed at 180–185° C. After approximately 30 minutes, the reaction mixture became too thick to stir. Heating was continued at 180–185° C for an additional hour. After cooling to room temperature, the resulting rubbery material was washed twice in a blender with an acetone-concentrated hydrochloric acid mixture and once with acetone to provide 193 g. of product. Infrared analysis and the following analytical data revealed that a random copolymer consisting essentially of units having the following formula wherein the mole ratio of $x$ to $y$ is 0.65 had been obtained.

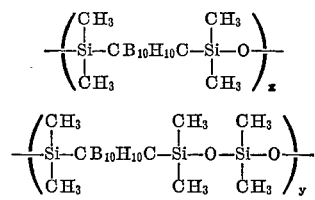

*Analysis.*—Calcd. for $C_{36}H_{128}B_{50}Si_{13}O_8$: C, 27.10; H, 8.09; B, 33.90; Si, 22.89. Found: C, 26.88; H, 8.03; B, 32.31; Si, 22.97.

B. Preparation of adhesive composition

One hundred parts by weight of the polymer described in Part A were mixed with 50 parts of metaboric acid until a good dispersion was obtained. The resulting composition was passed through a warm mill (approximately 100–110° F.) until banded. Milling was continued until the composition appeared homogenous. The rollers were adjusted and the compounded adhesive composition cut off as a 15 mil thick sheet. Shear strength was determined and is set forth in the table below.

EXAMPLE 2

A. Preparation of polymer 1,7-bis(methoxydimethylsilyl)-m-carborane (72.41 g.), 1,7-bis(chlorodimethylsilyl)-m-carborane (36.70 g.) and dimethyldichlorosilane (14.78 g.) were reacted in the presence of anhydrous ferric chloride (0.37 g.) and hydrated ferric chloride (0.37 g.) in the same manner as described in Example 1. Infrared analysis and the following analytical data revealed that a random copolymer having units of the formula set forth in Example 1 wherein the mole ratio of $x$ to $y$ is 1.9 has been obtained.

*Analysis.*—Calcd. for $C_{20}H_{72}B_{30}Si_7O_4$: C, 26.75; H, 8.08; B, 36.14; Si, 21.90. Found: C, 26.00; H, 7.98; B, 34.93; Si, 22.41.

B. Preparation of adhesive composition

Following the procedure of Example 1, Part B, an adhesive composition was made employing 100 parts by weight of the polymer described in Part 1 and 50 parts of metaboric acid; shear strength is set forth in the table below.

EXAMPLE 3

A. Preparation of polymer

Following the general procedure of Example 1, 98.77 g. 1,7 - bis(methoxydimethylsilyl) - m - carborane, 75.6187 g. 1,7-bis(chlorodimethylsilyl)-m-carborane and 10.1473 g. dimethyldichlorosilane were reacted at room temperature in the presence of 0.5 g. anhydrous ferric chloride and 0.5 g. of hydrated ferric chloride to provide 141 g. of a hard, brittle product. Infrared analysis and the following analytical data revealed that a random copolymer having units of the formula set forth in Example 1 wherein the mole ratio of $x$ to $y$ is about 5.8 had been obtained.

*Analysis.*—Calcd. for $C_{26}H_{94}B_{40}Si_9O_5$: C, 26.47; H, 8.08; B, 37.94; Si, 21.10. Found: C, 25.78; H, 8.05; B, 36.20; Si, 21.00

B. Preparation of adhesive composition

Following the procedure of the previous examples, an adhesive composition was made employing 100 parts by weight of the polymer described in Part 1 and 50 parts of metaboric acid; shear strength is set forth in the table below.

EXAMPLE 4

A. Preparation of polymer 1,7-bis(chlorodimethylsilyl)-m-carborane (73.338 g.), 1,7-bis(methoxydimethylsilyl)-m-carborane (95.138 g.), dichloro(1-vinyl-o-carborane-2-yl)methylsilane (0.252 g.) and dimethyldichlorosilane (9.54 g.) were reacted in the presence of a mixture of 0.24 g. of anhydrous ferric chloride and 0.24 g. of hydrated ferric chloride at a temperature of about 134–140° C. After approximately 50 minutes, gas evolution ceased and an additional amount of hydrated ferric chloride (0.48 g.) was added. The reaction mixture was then heated to 180–183° C., at which point gas evolution resumed. After 15 minutes the reaction mixture became too thick to stir. It was then heated for an additional hour at 182–183° C. The resulting product was cooled to room temperature, ground to a fine powder and washed with acetone to provide 137 g. of white product. Infrared analysis and the following analytical data revealed that a random copolymer composed of units having the following formula wherein the ratio of $x$ to $y+z$ is 5.9 had been obtained.

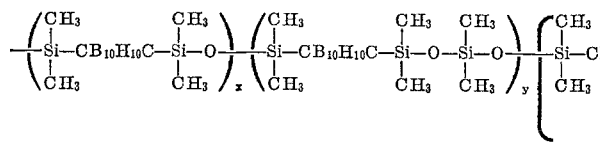

*Analysis.*—Calcd. for $C_{44.00}H_{159.98}B_{70.02}Si_{14.99}O_{8.00}$: C, 26.47; H, 8.08; B, 37.95; Si, 20.09. Found: C, 22.25; H, 8.26; B, 37.46; Si, 19.31

B. Preparation of adhesive composition

Following the procedure of the previous examples, an adhesive composition was made employing 100 parts by weight of the polymer described in Part 1 and 50 parts of metaboric acid; shear strength is set forth in the table below.

EXAMPLE 5

A. Preparation of polymer

Following the procedure of the previous examples, 1,7-bis(chlorodimethylsilyl)-m-carborane (52.863 g.), 1,7-bis(methoxydimethylsilyl)-m-carborane (102.877 g.), dichloro(1-vinyl-o-carboran-2-yl)methylsilane (0.273) and dimethyldichlorosilane (20.7 g.) were reacted in the presence of anhydrous ferric chloride (0.26 g.) and hydrated ferric chloride (0.26) to provide 141 g. of polymer. Infrared analysis and the following analytical data revealed that the product had the formula set forth in Example 4 with a mole ratio of $x/y+z$ of 2.0.

*Analysis.*—Calcd. for $C_{20.00}H_{71.99}B_{30.02}Si_{6.99}O_{4.00}$: C, 26.75; H, 8.08; B, 36.17; Si, 21.88. Found: C, 24.74; H, 9.09; B, 36.07; Si, 19.26.

B. Preparation of adhesive composition

Following the procedure of the previous examples, adhesive compositions were made employing the polymer described in Part A; the ingredients and proportions employed are set forth below.

| Example | Boron-oxygen-containing compound | Parts/100 parts polymer |
|---|---|---|
| 5a | Boric oxide | 25 |
| 5b | Metaboric acid | 50 |
| 5c | Boric oxide | 80 |

The shear strength for these adhesive compositions are listed in the table; no primer was used in testing the adhesive compositions of Examples 5a and 5c.

EXAMPLE 6

A. Preparation of polymer 1,7-bis(chlorodimethylsilyl)-m-carborane (69.70 g.), 1,7-bis(methoxydimethylsilyl)-m-carborane (271.30 g.), dimethyldichlorosilane (31.6 g.) and dichloro(1-vinyl-o-carboran-2-yl)methylsilane (0.7192 g.) were reacted in the presence of 0.69 g. anhydrous ferric chloride and 0.68 g. of hydrated ferric chloride to provide 300 g. of rubbery product. Infrared analysis and the following analytical data revealed that a random copolymer having the formula set forth in Example 4 wherein the mole ratio of $x/y+z$ is 0.67 had been obtained.

*Analysis.*—Calcd. for $C_{36.00}H_{127.99}B_{50.06}Si_{12.99}O_{7.99}$: C, 27.10; H, 8.08; B, 33.94; Si, 22.86. Found: C, 23.64; H, 8.07; B, 33.73; Si, 19.94.

B. Preparation of adhesive composition

Following the procedure of the previous examples, an adhesive composition was made employing 100 parts by weight of the polymer described in Part 1 and 50 parts of boric oxide; shear strength is set forth in the table.

COMPARATIVE EXAMPLE 1

A. Preparation of polymer 1,7-bis(methoxydimethylsilyl-m-carborane (468.67 g., 1.4615 mole), 1,7-bis(chlorodimethylsilyl)-m-carborane (481.7 g., 1.4615 mole), and a mixture of 1.2 g. anhydrous ferric chloride and 1.2 g. hydrated ferric chloride were mixed in a 3-liter resin kettle. The flask was placed in an oil bath and heat was applied. Gas evolution began at 178° C. and the reaction was completed in one hour, at which time the temperature was 185° C. The resulting solid polymer was ground to a fine powder and washed with an acetone/hydrochloric acid mixture, acetone, refluxing xylene, and finally acetone. The resulting material was dried under vacuum to provide 773 g. of an essentially colorless powder which was insoluble in the common organic solvents. Infrared analysis revealed that a product comprising the recurring units having the following formula had been obtained.

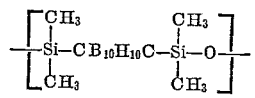

B. Preparation of adhesive composition

Following the procedure of the previous examples, adhesive compositions were made employing the polymer described in Part A; the ingredients and proportions employed are set forth below and the shear strengths are recorded in the table.

| Example | Boron-oxygen-containing compound | Parts/100 parts polymer |
|---|---|---|
| C1a | Metaboric acid | 50 |
| C1b | Boric oxide | 50 |

COMPARATIVE EXAMPLE 2

A. Preparation of polymer

Following the procedure of Comparative Example 1, 1,7-bis(methoxydimethylsilyl)-m-carborane (307.70 g., 0.9595 mole), 1,7-bis(chlorodimethylsilyl)-m-carborane (315.30 g., 0.9566 mole) and dichloro(1-vinyl-o-carboran-2-yl)methylsilane (0.8157 g., 0.0029 mole) were reacted in the presence of 0.77 g. of ferric chloride and 0.77 g. of hydrated ferric chloride to provide an insoluble, essentially colorless powder. Infrared analysis revealed that the product consisted of recurring units having the following formulas.

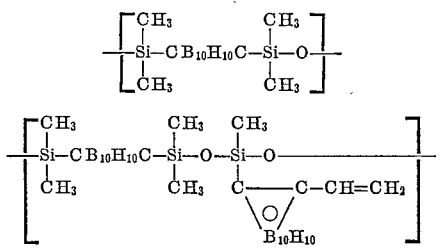

B. Preparation of adhesive composition

Following the procedure of the previous examples, adhesive compositions were made employing the polymer described in Part A; the ingredients and proportions employed are set forth below and the shear strengths are recorded in the table.

| Example | Boron-oxygen-containing compound | Parts/100 parts polymer |
|---|---|---|
| C2a | Metaboric acid | 50 |
| C2b | Boric oxide | 50 |

COMPARATIVE EXAMPLE 3

A. Preparation of polymer

Following the general procedure set forth in Comparative Example 1, 1,7 - bis(methoxydimethylsilyl)-m-carborane (110.6605 g.), dichlorodimethylsilane (44.3837 g.), dichloro-(1-vinylcarboran-2-yl)methylsilane (0.2919 g.) and anhydrous ferric chloride (1.12 g. total) were reacted to provide a light brown, dry elastomeric product. A final oil bath temperature of 184° C. was observed. Infrared analysis confirmed that the product consisted of recurring units having the following formulas.

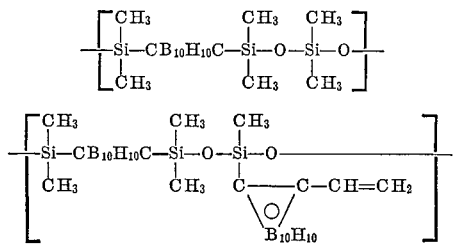

B. Preparation of adhesive composition

Following the procedure of the previous examples, adhesive compositions were made employing the polymer described in Part A; the ingredients and proportions employed are set forth below and the shear strengths are recorded in the table.

| Example | Boron-oxygen-containing compound | Parts/100 parts polymer |
|---|---|---|
| C3a | Metaboric acid | 50 |
| C3b | Boric oxide | 50 |

Table.—Shear strength of adhesives

| Example: | Shear strength, p.s.i. |
|---|---|
| 1 | 1950 |
| 2 | 1630 |
| 3 | 2080 |
| 4 | 1500, 1600 |
| 5a | 1060 |
| 5b | 1810, 1975 |
| 5c | 1180 |
| 6 | 1960, 1590, 1550, 2060 |
| Comparative 1a | 720 |
| Comparative 1b | 895, 880, 920 |
| Comparative 2a | 625 |
| Comparative 2b | 895, 935 |
| Comparative 3a | 830 |
| Comparative 3b | 875, 855 |

What is claimed is:

1. An adhesive-forming composition which comprises
(a) a random poly-m-carboranylenesiloxane copolymer comprising units having the formulas

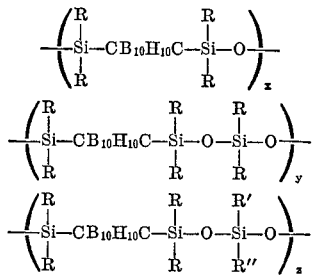

wherein each R is an independently selected lower alkyl moiety; R' is lower alkyl or phenyl; R'' is vinyl or 1-vinyl-o-carboran-2-yl; $x$ and $y$ are independently selected integers greater than 1 and $z$ is 0 or an integer greater than 0 with the proviso that the mole ratio of $x/y+z$ is between about 0.1 and about 10 and
(b) a boron-oxygen-containing compound selected from the group consisting of the boric acids, salts of the boric acids, esters of the boric acids, boric oxide, and mixtures thereof in an amount between about 10 and about 100 parts by weight per 100 parts by weight of said random poly-m-carboranylenesiloxane copolymer.

2. The adhesive-forming composition of claim 1 in which said boron-oxygen-containing compound is employed in an amount between about 40 and about 60 parts by weight per 100 parts by weight of said random poly-m-carboranylenesiloxane copolymer.

3. The adhesive-forming composition of claim 1 wherein a random poly-m-carboranylenesiloxane copolymer having a molecular weight greater than about 2,000 is employed.

4. The adhesive-forming composition of claim 1 wherein R is methyl.

5. The adhesive-forming composition of claim 4 wherein $z$ is 0.

6. The adhesive-forming composition of claim 4 wherein $z$ is an integer greater than 0 and R' is 1-vinyl-o-carboran-2-yl.

7. The adhesive forming composition of claim 2 wherein R is methyl, $z$ is 0, the mole ratio of $x/y+z$ is about 2.0 and said boron-oxygen-containing compound is metaboric acid.

8. An adhesive which comprises the heat-cured product of the composition of claim 1.

9. An adhesive which comprises the heat-cured product of the composition of claim 2.

10. An adhesive which comprises the heat-cured product of the composition of claim 3.

11. An adhesive which comprises the heat-cured product of the composition of claim 4.

12. An adhesive which comprises the heat-cured product of the composition of claim 5.

13. An adhesive which comprises the heat-cured product of the composition of claim 6.

14. A composite article comprised of at least two members bonded together with the adhesive of claim 8.

References Cited

UNITED STATES PATENTS

| 2,721,857 | 10/1955 | Dickmann | 260—46.5 |
| 3,146,799 | 9/1964 | Fekete | 260—46.5 |
| 3,213,048 | 10/1965 | Boot | 260—18 |
| 3,388,090 | 6/1968 | Heying et al. | 260—37 |
| 3,388,092 | 6/1968 | Heying et al. | 260—37 |

OTHER REFERENCES

Papetti et al., The Preparation of Poly-m-carboranylenesiloxanes, Polymer Preprints, American Chemical Society, Division of Polymer Chemistry, September 1965, pp. 1110 to 1121, vol. 6, No. 2.

Schroeder et al., Poly-m-carboranylsiloxanes as Thermoresistant Elastomers, Rubber Chemistry and Technology, September 1966, pp. 1184 to 1198.

HOSEA E. TAYLOR, JR., *Primary Examiner.*

M. T. MARQUIS, *Assistant Examiner.*

U.S. Cl. X.R.

156—329; 161—193; 260—37